US012682565B2

(12) United States Patent (10) Patent No.: US 12,682,565 B2
Lan et al. (45) Date of Patent: Jul. 14, 2026

(54) 3D MODEL GENERATION METHOD AND RELATED APPARATUS

(71) Applicant: HUAWEI TECHNOLOGIES CO., LTD., Shenzhen (CN)

(72) Inventors: Wanjun Lan, Shenzhen (CN);
Jingtang Liao, Shenzhen (CN);
Congling Wan, Shenzhen (CN);
Zhiping Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 18/785,149

(22) Filed: Jul. 26, 2024

(65) Prior Publication Data

US 2024/0386668 A1 Nov. 21, 2024

Related U.S. Application Data

(63) Continuation of application No. PCT/CN2023/070684, filed on Jan. 5, 2023.

(30) Foreign Application Priority Data

Jan. 27, 2022 (CN) .......................... 202210104058.5

(51) Int. Cl.
*G06T 17/00* (2006.01)
*G06T 15/04* (2011.01)

(52) U.S. Cl.
CPC .............. *G06T 17/00* (2013.01); *G06T 15/04* (2013.01); *G06T 2210/08* (2013.01)

(58) Field of Classification Search
CPC ...... G06T 17/00; G06T 2210/08; G06T 15/04
See application file for complete search history.

(56) References Cited

U.S. PATENT DOCUMENTS

2022/0092828 A1* 3/2022 Jeda ........................ G06V 20/00
2024/0029376 A1* 1/2024 Mikhail ................... G06F 3/013

FOREIGN PATENT DOCUMENTS

CN 111832170 A 10/2020
CN 112634425 A 4/2021

* cited by examiner

*Primary Examiner* — Antonio A Caschera

(57) ABSTRACT

A 3D model generation method includes: sending an obtaining request to a server, where the obtaining request carries a user identifier and a 3D model category identifier; receiving a response message sent by the server in response to the obtaining request, where the response message includes a component element set of a target 3D model and a combination rule of the target 3D model that are determined by the server based on the user identifier and the 3D model category identifier; the server stores at least one component element and at least one preset combination rule; and a quantity of component elements in the component element set is less than a quantity of component elements forming the target 3D model; performing combination and rendering based on the component element set and the combination rule, to obtain the target 3D model.

15 Claims, 5 Drawing Sheets

Terminal device

Server

Terminal device

Server

Rendering display device

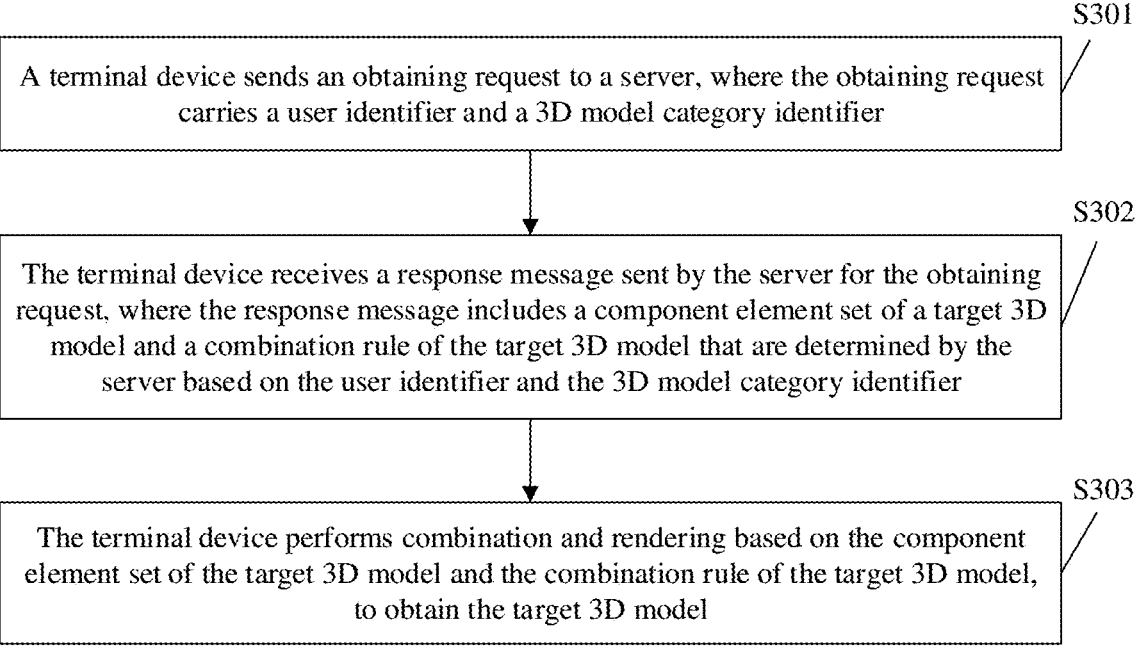

S301

A terminal device sends an obtaining request to a server, where the obtaining request carries a user identifier and a 3D model category identifier

S302

The terminal device receives a response message sent by the server for the obtaining request, where the response message includes a component element set of a target 3D model and a combination rule of the target 3D model that are determined by the server based on the user identifier and the 3D model category identifier

S303

The terminal device performs combination and rendering based on the component element set of the target 3D model and the combination rule of the target 3D model, to obtain the target 3D model

FIG. 3

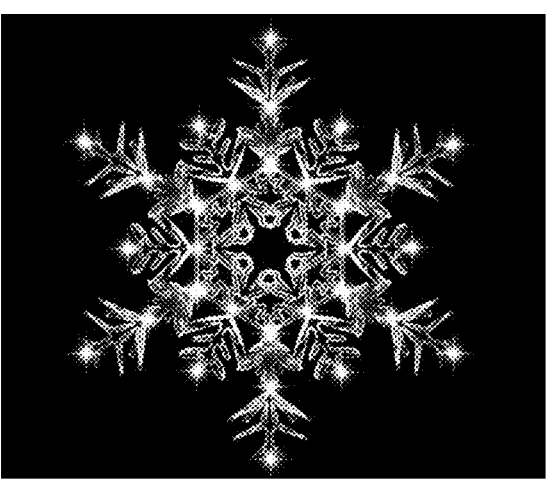

3D MODEL GENERATION METHOD AND RELATED APPARATUS

CROSS-REFERENCE TO RELATED APPLICATIONS

This application is a continuation of International Application No. PCT/CN2023/070684, filed on Jan. 5, 2023, which claims priority to Chinese Patent Application No. 202210104058.5, filed on Jan. 27, 2022. The disclosures of the aforementioned applications are hereby incorporated by reference in their entireties.

TECHNICAL FIELD

This application relates to the field of three-dimensional graphic modeling, and in particular, to a 3D model generation method and a related apparatus.

BACKGROUND

With the rise of the metaverse, the demand for 3D digital content is increasing. The 3D digital content is usually generated in the following two methods: One is obtaining through scanning the real world and converting geometric and material information of objects in the real world into computer expressions such as mesh and material mapping; and the other is creating the digital content by art designers through modeling software from nothing. The digital content generated in the two methods is usually provided to a user or an application in a complete 3D model form. With continuous accumulation of the 3D digital content, costs of storing, rendering, and displaying the 3D digital content also increase continuously.

SUMMARY

Embodiments of this application provide a 3D model generation method and a related apparatus. This application can reduce storage overheads of 3D digital content and improve rendering efficiency.

According to a first aspect, an embodiment of this application provides a 3D model generation method, including:

A terminal device sends an obtaining request to a server, where the obtaining request carries a user identifier and a 3D model category identifier.

The terminal device receives a response message sent by the server for the obtaining request. The response message includes a component element set of a target 3D model and a combination rule of the target 3D model that are determined by the server based on the user identifier and the 3D model category identifier. The server stores at least one component element and at least one preset combination rule, the at least one preset combination rule corresponds to at least one component element set, and each of the at least one component element set includes one or more of the at least one component element. The combination rule of the target 3D model is a combination rule that is in the at least one preset combination rule and that corresponds to the component element set of the target 3D model. A quantity of component elements in the component element set of the target 3D model is less than a quantity of component elements forming the target 3D model.

The terminal device performs combination and rendering based on the component element set of the target 3D model and the combination rule of the target 3D model, to obtain the target 3D model.

Because the server stores the component element and the combination rule that can form a 3D model, compared with the conventional technology in which a complete 3D model is stored, the method in this application can reduce storage overheads of the server. Because the component element set and the combination rule instead of the complete 3D model are transmitted between the terminal device and the server, bandwidth resources between the terminal device and the server can be reduced. During rendering, the complete 3D model is rendered only by using rendering information of the component element in the component element set, rather than rendering information of the component elements forming the complete 3D model. This can reduce the overheads of storing the rendering information, and improve rendering efficiency of the model.

In a feasible embodiment, the component element set of the target 3D model includes geometric information of each component element in the component element set of the target 3D model; and that the terminal device performs combination and rendering based on the component element set of the target 3D model and the combination rule of the target 3D model, to obtain the target 3D model includes:

The terminal device copies some or all component elements in the component element set of the target 3D model according to the combination rule, to obtain the component elements forming the target 3D model.

The terminal device performs, according to the combination rule, combination processing on the component elements forming the target 3D model, to obtain the target 3D model that is not rendered.

The terminal device renders, based on the geometric information of each component element in the component element set of the target 3D model, the target 3D model that is not rendered, to obtain the target 3D model.

In a feasible embodiment, the server further stores material textures information of each of the at least one component element, and the response message further carries material textures information of each component element in the component element set of the target 3D model; and the rending, based on the geometric information of each component element in the component element set of the target 3D model, the target 3D model that is not rendered, to obtain the target 3D model includes:

rendering, based on the material textures information and the geometric information of each component element in the component element set of the target 3D model, the target 3D model that is not rendered, to obtain the target 3D model.

The material textures information is introduced during rendering, and a more vivid 3D model with rich information can be obtained.

In a feasible embodiment, the method in this application further includes:

The terminal device obtains material textures information that is of each component element in the component element set and that is input by a user.

That the terminal device renders, based on the geometric information of each component element in the component element set of the target 3D model, the target 3D model that is not rendered, to obtain the target 3D model includes:

The terminal device renders, based on the material textures information input by the user and the geometric information that are of each component element in the component element set of the target 3D model, the target 3D model that is not rendered, to obtain the target 3D model.

In the manner of this embodiment, the material textures information input by the user is introduced during rendering, and a personalized requirement of the user for a 3D model can be met.

According to a second aspect, an embodiment of this application provides a 3D model generation method, including:

receiving an obtaining request sent by a terminal device, where the obtaining request carries a user identifier and an identifier of a 3D model; obtaining a component element set of a target 3D model and a combination rule of the target 3D model from a server based on the user identifier and the identifier of the 3D model, where the server stores at least one component element and at least one preset combination rule; the at least one preset combination rule corresponds to at least one component element set, and each of the at least one component element set includes one or more of the at least one component element; the combination rule of the target 3D model is a combination rule that is in the at least one preset combination rule and that corresponds to the component element set of the target 3D model; and a quantity of component elements in the component element set of the target 3D model is less than a quantity of component elements forming the target 3D model; and sending a response message for the obtaining request to the terminal device, where the response message includes the component element set of the target 3D model and the combination rule of the target 3D model.

Because the server stores the component element and the combination rule that can form a 3D model, compared with the conventional technology in which a complete 3D model is stored, the method in this application can reduce storage overheads of the server. Because the component element set and the combination rule instead of the complete 3D model are transmitted between the terminal device and the server, bandwidth resources between the terminal device and the server can be reduced.

In a feasible embodiment, the server further stores material textures information of each of the at least one component element, and the response message further carries material textures information of each component element in the component element set of the target 3D model.

The material textures information is introduced during rendering, and a more vivid 3D model with rich information can be obtained.

According to a third aspect, an embodiment of this application further provides a terminal device, including:

a sending unit, configured to send an obtaining request to a server, where the obtaining request carries a user identifier and a 3D model category identifier;

a receiving unit, configured to receive a response message sent by the server for the obtaining request, where the response message includes a component element set of a target 3D model and a combination rule of the target 3D model that are determined by the server based on the user identifier and the 3D model category identifier; the server stores at least one component element and at least one preset combination rule, the at least one preset combination rule corresponds to at least one component element set, and each of the at least one component element set includes one or more of the at least one component element; the combination rule of the target 3D model is a combination rule that is in the at least one preset combination rule and that corresponds to the component element set of the target 3D model; and a quantity of component elements in the component element set of the target 3D model is less than a quantity of component elements forming the target 3D model; and a combination rendering unit, configured to perform combination and rendering based on the component element set of the target 3D model and the combination rule of the target 3D model, to obtain the target 3D model.

In a feasible embodiment, the component element set of the target 3D model includes geometric information of each component element in the component element set of the target 3D model, and the combination rendering unit is specifically configured to:

copy some or all component elements in the component element set of the target 3D model according to the combination rule, to obtain the component elements forming the target 3D model; perform, according to the combination rule, combination processing on the component elements forming the target 3D model, to obtain the target 3D model that is not rendered; and render, based on the geometric information of each component element in the component element set of the target 3D model, the target 3D model that is not rendered, to obtain the target 3D model.

In a feasible embodiment, the server further stores material textures information of each of the at least one component element, and the response message further carries material textures information of each component element in the component element set of the target 3D model; and when rendering, based on the geometric information of each component element in the component element set of the target 3D model, the target 3D model that is not rendered, to obtain the target 3D model, the combination rendering unit is specifically configured to:

render, based on the material textures information and the geometric information of each component element in the component element set of the target 3D model, the target 3D model that is not rendered, to obtain the target 3D model.

In a feasible embodiment, the terminal device further includes:

an obtaining unit, configured to obtain material textures information that is of each component element in the component element set and that is input by a user; and when rendering, based on the geometric information of each component element in the component element set of the target 3D model, the target 3D model that is not rendered, to obtain the target 3D model, the combination rendering unit is specifically configured to:

render, based on the material textures information input by the user and the geometric information that are of each component element in the component element set of the target 3D model, the target 3D model that is not rendered, to obtain the target 3D model.

According to a fourth aspect, an embodiment of this application provides a server, including:

a receiving unit, configured to receive an obtaining request sent by a terminal device, where the obtaining request carries a user identifier and an identifier of a 3D model;

a determining unit, configured to obtain a component element set of a target 3D model and a combination rule of the target 3D model from the server based on the user identifier and the identifier of the 3D model, where the server stores at least one component element and at least one preset combination rule; the at least one preset combination rule corresponds to at least one component element set, and each of the at least one component element set includes one or more of the at least one component element; the combination rule of the target 3D model is a combination rule that is in the at least one preset combination rule and that corresponds to the component element set of the target 3D model; and a quantity of component elements in the component element set of the target 3D model is less than a quantity of component elements forming the target 3D model; and a sending unit, configured to send a response message for the obtaining request to the terminal device, where the response message includes the component element set of the target 3D model and the combination rule of the target 3D model.

In a feasible embodiment, the server further stores material textures information of each of the at least one component element, and the response message further carries material textures information of each component element in the component element set of the target 3D model.

According to a fifth aspect, an embodiment of this application further provides a terminal device, including a processor and a memory. The processor is connected to the memory, the memory is configured to store program code, and the processor is configured to invoke the program code, to perform a part or all of the method according to the first aspect.

According to a sixth aspect, an embodiment of this application further provides a server, including a processor and a memory. The processor is connected to the memory, the memory is configured to store program code, and the processor is configured to invoke the program code, to perform a part or all of the method according to the second aspect.

According to a seventh aspect, an embodiment of this application further provides a chip system. The chip system is used in an electronic device. The chip system includes one or more interface circuits and one or more processors. The interface circuit and the processor are interconnected through a line. The interface circuit is configured to receive a signal from a memory of the electronic device, and send the signal to the processor, where the signal includes computer instructions stored in the memory. When the processor executes the computer instructions, the electronic device performs a part or all of the method according to the first aspect or the second aspect.

According to an eighth aspect, an embodiment of this application further provides a computer-readable storage medium. The computer-readable storage medium stores a computer program, and the computer program is executed by a processor to implement a part or all of the method according to the first aspect or the second aspect.

According to a ninth aspect, an embodiment of this application further provides a computer program. The computer program is executed to implement a part or all of the method according to the first aspect or the second aspect.

These aspects or other aspects of this application are more concise and easier to understand in the description of the following embodiments.

BRIEF DESCRIPTION OF DRAWINGS

To describe the technical solutions in embodiments of this application or the conventional technology more clearly, the following briefly describes the accompanying drawings for describing embodiments or the conventional technology. It is clear that the accompanying drawings in the following description show some embodiments of this application, and a person of ordinary skill in the art may still derive other drawings from these accompanying drawings without creative efforts.

FIG. 3 is a schematic flowchart of an example 3D model generation method according to an embodiment of this application;

FIG. 4 is a schematic diagram of an example snowflake 3D model according to an embodiment of this application;

DESCRIPTION OF EMBODIMENTS

Details are separately described in the following.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

"A plurality of" refers to two or more than two. The term "and/or" describes an association relationship for describing associated objects and represents that any one of three relationships may exist. For example, A and/or B may represent one of the following three cases:

Only A exists, both A and B exist, or only B exists. The character "/" generally indicates an "or" relationship between the associated objects.

The following explains and describes terms used in this application.

Figure 1:
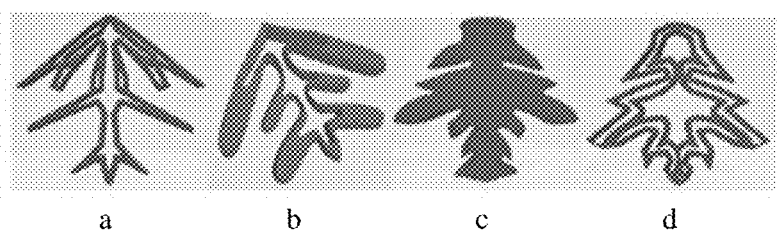
FIG. 1 is a schematic diagram of an example component element set according to an embodiment of this application.

Component elements are 3D models with different shapes. Component elements forming a person or an object are a component element set. For example, a 3D model of one person includes a head 3D model, a limb 3D model, and a torso 3D model, and the head 3D model, the limb 3D model, and the torso 3D model may form a component element set. FIG. 1 shows four component elements forming a snowflake 3D model. The four component elements may form a component element set of the snowflake 3D model.

A combination rule describes a process of combining component elements at a specific spatial location (such as symmetry, even distribution, or function description) after a specific processing (such as rotation or scaling) is performed.

The following describes embodiments of this application with reference to the accompanying drawings.

Figure 2A:
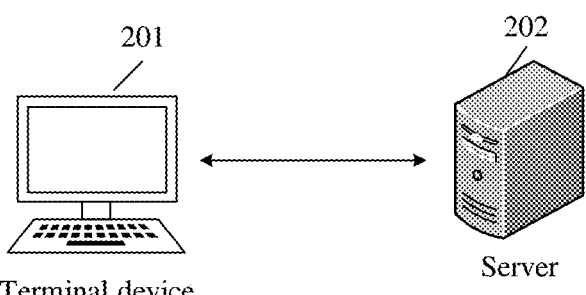
FIG. 2a is a schematic diagram of an example system according to an embodiment of this application.

FIG. 2a is a schematic diagram of an example system according to an embodiment of this application. As shown in FIG. 2a, the system includes a terminal device 201 and a server 202.

The terminal device 201 is a device that can perform data processing and graphics rendering functions. Common terminal devices include a mobile phone, a tablet computer, a notebook computer, a palmtop computer, a mobile internet device (MID), an internet of things device, a wearable device (such as a smartwatch, a smart band, or a pedometer), and the like.

The server 202 is a device that can be used for data storage, processing, and transmission, for example, a cloud server, a distributed server, an integrated server, a rack server, a cabinet server, and a blade server.

The terminal device 201 sends an obtaining request to the server 202. The obtaining request carries an identifier of a target 3D model, the server 202 stores at least one component element and at least one preset combination rule, the at least one preset combination rule corresponds to at least one component element set, and each of the at least one component element set includes one or more of the at least one component element. The server 202 obtains a component element set of the target 3D model from the at least one component element, and obtains a combination rule of the target 3D model from a plurality of preset combination rules based on the user identifier and the 3D model category identifier. The server 202 sends, to the terminal device 201, a response message carrying the component element set of the target 3D model and the combination rule of the target 3D model. After receiving the component element set of the target 3D model and the combination rule of the target 3D model, the terminal device 201 performs combination and rendering based on the component element set of the target 3D model and the combination rule of the target 3D model, to obtain the target 3D model.

Figure 2B:
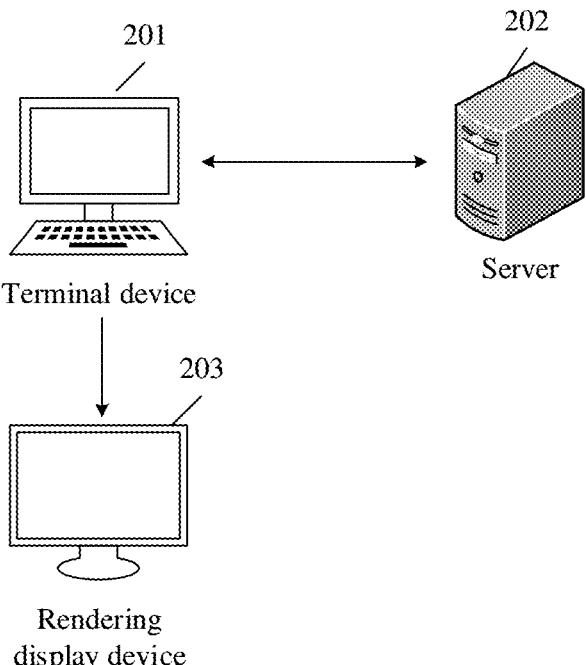
FIG. 2b is a schematic diagram of another example system according to an embodiment of this application.

In another example, as shown in FIG. 2b, the system further includes a rendering display device 203. After obtaining, based on the component element set and the combination rule of the target 3D model, the target 3D model that is not rendered, the terminal device 201 inputs, to the rendering display device 203, the target 3D model that is not rendered, and the rendering display device 203 renders and displays the target 3D model that is not rendered.

It should be noted herein that representation forms of the foregoing component elements include but are not limited to a point cloud and a mesh.

It can be learned that, in the solution of this application, the server stores the component element and the combination rule that can form the 3D model. Compared with the conventional technology in which a complete 3D model is stored, the method in this application can reduce storage overheads of the server. Because the component element set and the combination rule instead of the complete 3D model are transmitted between the terminal device and the server, bandwidth resources between the terminal device and the server can be reduced. During rendering, the complete 3D model is rendered only by using rendering information of the component element in the component element set, rather than rendering information of the component elements forming the complete 3D model. This can reduce overheads of storing the rendering information, and improve rendering efficiency of the model.

Optionally, the rendering information may include geometric information of the component element, and may further include material textures information of the component element.

FIG. 3 is a schematic flowchart of an example 3D model generation method according to an embodiment of this application. As shown in FIG. 3, the method includes the following steps.

S301: A terminal device sends an obtaining request to a server, where the obtaining request carries a user identifier and a 3D model category identifier.

Optionally, the user identifier may be an ID of a user, or a profile picture of a user, or fingerprint information or voiceprint information of a user. Optionally, the 3D model category identifier may be a 3D model ID or a 3D model image.

Component elements forming the 3D model include same or similar component elements. A target 3D model may be a symmetric model, for example, a petal 3D model, a snowflake 3D model, or a fruit 3D model. Optionally, some models in the target 3D models are symmetric.

S302: The terminal device receives a response message sent by the server for the obtaining request, where the response message includes a component element set of the target 3D model and a combination rule of the target 3D model that are determined by the server based on the user identifier and the 3D model category identifier.

The server stores at least one component element and at least one preset combination rule, the at least one preset combination rule corresponds to at least one component element set, and each of the at least one component element set includes one or more of the at least one component element. The combination rule of the target 3D model is a combination rule that is in the at least one preset combination rule and that corresponds to the component element set of the target 3D model. A quantity of component elements in the component element set of the target 3D model is less than a quantity of component elements forming the target 3D model.

Optionally, the response message further includes an identifier of each component element in the component element set of the target 3D model, and indicates a type of the component element. For example, for a component element forming a human 3D model, whether the component element is a head component element or a limb component element may be determined based on the identifier of the component element. Optionally, the response message further includes a start bit and/or an end bit of each component element in the component element set of the target 3D model. The component element may be determined in the response message by using the start bit and/or the end bit of the component element.

Optionally, the response message further includes a start bit and/or an end bit of the combination rule of the target 3D model. The combination rule may be determined in the response message by using the start bit and/or the end bit of the combination rule. Optionally, the response message further includes an identifier of the combination rule, and indicates a type of the combination rule.

In an example, the server stores at least one component element set of the 3D model, and at least one combination rule corresponding to the at least one component element set of the 3D model, and a correspondence table. The correspondence table is a correspondence table between a component element set of the 3D model and a user identifier and a 3D model category identifier. After receiving the user identifier and the 3D model category identifier, the server determines the component element set of the target 3D model based on the received user identifier, 3D model category identifier, and correspondence table, and obtains the combination rule corresponding to the component element set of the target 3D model.

In another embodiment, the server stores at least one category of component element set. A component element set in the at least one category of component element set includes at least one component element, and one or more of the at least one component element correspond to one user identifier. After receiving the user identifier and the 3D model category identifier, the server determines, based on the 3D model category identifier, that a 3D model required by the terminal device is the target 3D model, that is, a model indicated by the 3D model category identifier is the target 3D model. When determining the target 3D model, the server determines based on prior knowledge, a category of component elements forming the target 3D model; and determines, from the plurality of categories of component element sets based on the category of the component elements forming the target 3D model, one or more component element sets corresponding to the categories of the component elements forming the target 3D model. The terminal device determines, from each component element set of the one or more component element sets based on the user identifier, one or more component elements corresponding to the target user identifier. If a plurality of component elements are determined from one component element set, the terminal device selects, from the plurality of component elements, one component element that is most frequently used by the user. In this manner, the terminal device selects, from each of the one or more component element sets, one component element corresponding to the target user identifier, and these selected component elements form the component element set of the target 3D model. In the server, a category of component element set corresponds to a combination rule, that is, combination rules of component elements belonging to a same category are the same, and are all combination rules corresponding to the category of component element set. When the component element set of the target 3D model is obtained, in the foregoing manner, from the at least one component element set stored in the server, a combination rule of each component element in the component element set of the target 3D model may also be obtained at the same time. In this case, it may be considered that the combination rule of the target 3D model includes the combination rule of each component element in the component element set of the target 3D model.

In another embodiment, the server stores at least one component element or at least one category of component element set. After obtaining the user identifier and the 3D model category identifier, the server processes the user identifier and the 3D model category identifier based on a preset function, to obtain an identifier of the component element in the component element set of the target 3D model; and determines, based on the identifier of the component element, an element indicated by the identifier of the component element from the component element stored in the memory. These component elements form the component element set of the target 3D model. In the server, a category of component element set corresponds to a combination rule, that is, combination rules of component elements belonging to a same category are the same, and are all combination rules corresponding to the category of component element set. When the component element set of the target 3D model is obtained, in the foregoing manner, from the at least one component element set stored in the server, a combination rule of each component element in the component element set of the target 3D model may also be obtained at the same time. In an example, the server further stores a combination rule of each of the at least one component element stored in the server. When determining the component element set of the target 3D model from the at least one component element stored in the server, the server may obtain the combination rule of each component element in the component element set of the target 3D model. In this case, it may be considered that the combination rule of the target 3D model includes the combination rule of each component element in the component element set of the target 3D model.

Optionally, the server stores the at least one preset combination rule, and the at least one preset combination rule corresponds to the at least one component element set. After determining, in the foregoing manner, the component element set of the target 3D model, the server determines, according to the correspondence between the at least one preset combination rule and the at least one component element set, the preset combination rule corresponding to the component element set of the target 3D model, where the combination rule is the combination rule of the target 3D model.

S303: The terminal device performs combination and rendering based on the component element set of the target 3D model and the combination rule of the target 3D model, to obtain the target 3D model.

In a feasible embodiment, the component element set of the target 3D model includes geometric information of each component element in the component element set of the target 3D model; and that the terminal device performs combination and rendering based on the component element set of the target 3D model and the combination rule of the target 3D model, to obtain the target 3D model includes:

The terminal device copies some or all component elements in the component element set of the target 3D model according to the combination rule, to obtain the component elements forming the target 3D model; perform, according to the combination rule, combination on the component elements forming the target 3D model, to obtain the target 3D model that is not rendered; and render, based on the geometric information of each component element in the component element set of the target 3D model, the target 3D model that is not rendered, to obtain the target 3D model.

The combination rule of the target 3D model is used to represent, in the target 3D model, a quantity, location information, whether to scale, whether to rotate, and the like of each component element in the component element set of the target 3D model. The terminal device copies, in the target 3D model, the component element based on the quantity of each component element in the component element set of the target 3D model. It should be understood that if there is only one component element in the target 3D model, the component element does not need to be scaled. If it is determined, according to a combination rule, to scale and/or rotate a component element, the component element is scaled and/or rotated. The component elements forming the target 3D model may be obtained by performing processing in the foregoing manner. A quantity of component elements forming the target 3D model is greater than a quantity of component elements in the target component element set of the target 3D model. The terminal device combines, based on the location information of the component element represented by the combination rule of the target 3D model, the component elements forming the target 3D model, to obtain the target 3D model that is not rendered. The component element set of the target 3D model includes geometric information of each component element in the component element set; and the terminal device renders, based on the geometric information of the component element, a corresponding component element in the component elements forming the target 3D model, to obtain the target 3D model. For example, the component elements forming the target 3D model include three component elements A and four component elements B. The terminal device renders the three component elements based on geometric information of the component element A, and renders the four component elements B based on geometric information of the component element B.

It should be noted herein that the location information indicates a combination relationship between component elements, for example, the component elements are evenly distributed, or distributed based on an equal distance, or distributed in a manner described by using a mathematical language.

In another specific embodiment, the combination rule of the target 3D model includes a combination rule of each component element in the component element set of the target 3D model. When obtaining the component element set and the combination rule of the target 3D model, the terminal device processes the component element according to the combination rule of each component element in the component element set of the target 3D model, including but not limited to one or more of copying, rotation, and scaling, to obtain component elements forming the target 3D model; combines the component elements of the target 3D model based on the location information indicated by the combination rule of each component element, to obtain the target 3D model that is not rendered; and renders, based on the geometric information of the component element, a corresponding component element in the component elements forming the target 3D model, to obtain the target 3D model.

It should be noted herein that a copying operation and a combination operation performed by the terminal device on the component element in the component element set of the target 3D model are not in a specific order. The copying operation may be performed before the combination operation, or the combination operation may be performed before the copying operation, or the copying operation and the combination operation may be performed simultaneously.

In a feasible embodiment, the server further stores material textures information of each of the at least one component element, and the response message further carries material textures information of each component element in the component element set of the target 3D model; and the rending, based on the geometric information of each component element in the component element set of the target 3D model, the target 3D model that is not rendered, to obtain the target 3D model includes:

rendering, based on the material textures information and the geometric information of each component element in the component element set of the target 3D model, the target 3D model that is not rendered, to obtain the target 3D model.

In a feasible embodiment, the method in this application further includes:

obtaining material textures information that is of each component element in the component element set and that is input by the user; and the rendering, based on the geometric information of each component element in the component element set of the target 3D model, the target 3D model that is not rendered, to obtain the target 3D model includes:

rendering, based on the material textures information input by the user and the geometric information that are of each component element in the component element set of the target 3D model, the target 3D model that is not rendered, to obtain the target 3D model.

When the component elements forming the target 3D model are rendered, material textures information of the component element is further used. In an embodiment, the server stores material textures information of each of the at least one component element, and the component element set of the target 3D model obtained by the terminal device from the server not only includes one or more component elements, but also includes the material textures information of each of the one or more component elements. In another embodiment, the material textures information of each component element in the component element set of the target 3D model is input by the user. That is, before rendering, the terminal device obtains the material textures information that is of each component element in the component element set of the target 3D model and that is input by the user, and then renders, based on the material textures information and the geometric information of each component element in the component element set of the target 3D model, the target 3D model that is not rendered, to obtain the target 3D model. Similar to the geometric information of the component element, during rendering, the terminal device renders, based on the material textures information of the component element, a corresponding component element in the component elements forming the target 3D model, to obtain the target 3D model. For example, the component elements forming the target 3D model include two component elements A and three component elements B. The terminal device renders the two component elements based on material textures information of the component element A, and renders the three component elements B based on material textures information of the component element B.

For example, assuming that the terminal device needs to generate a snowflake 3D model of a user A, the terminal device sends an identifier of the user A and a 3D model category identifier to the server, where the 3D model category identifier is used to indicate the snowflake 3D model. The server obtains a component element set and a combination rule of the snowflake 3D model based on the identifier of the user A and the 3D model category identifier. The component element set of the snowflake 3D model includes four component elements, including a component element a, a component element b, a component element c, and a component element d, as shown in FIG. 1. The terminal device copies each component element in the component element set of the snowflake 3D model according to the combination rule of the snowflake 3D model, so that a quantity of each component element is 6. That is, six component elements a, six component elements b, six component elements c, and six component elements d are obtained through copying, and there are 24 component elements in total. Then the terminal device combines the 24 component elements based on the location information of each component element indicated by the combination rule, to obtain the snowflake 3D model that is not rendered. The terminal device renders, based on the geometric information and the material textures information of the component element a, the six component elements a in the snowflake 3D model that is not rendered; renders, based on the geometric information and the material textures information of the component element b, the six component elements b in the snowflake 3D model that is not rendered; renders, based on the geometric information and the material textures information of the component element c, the six component elements c in the snowflake 3D model that is not rendered; and renders, based on the geometric information and the material textures information of the component element d, the six component elements d in the snowflake 3D model that is not rendered, to finally obtain the snowflake 3D model shown in FIG. 4.

In another example, the combination rule of the snowflake 3D model includes a combination rule of the component element a, a combination rule of the component element b, a combination rule of the component element c, and a combination rule of the component element d. The component element a is copied according to the combination rule of the component element a to obtain 6 component elements a. The component element b is copied according to the combination rule of the component element b to obtain 6 component elements b. The component element c is copied according to the combination rule of the component element c to obtain 6 component elements c. The component element d is copied according to the combination rule of the component element d to obtain 6 component elements d. According to the combination rule of the component element a, the six component elements a are separately rotated clockwise by 0°, 60°, 120°, 180°, 240°, and 300°, and then the rotated six component elements a are circled in ascending order of rotation degrees, to obtain a submodel formed by using the six component elements a. According to the combination rule of the component elements b, the six component elements b are separately rotated clockwise by 30°, 90°, 150°, 210°, 270°, and 330°, and then the rotated six component elements b are circled in ascending order of rotation degrees, to obtain a submodel formed by using the six component elements b. According to the combination rule of the component elements c, the six component elements c are separately rotated clockwise by 0°, 60°, 120°, 180°, 240°, and 300°, and then the rotated six component elements c are rotated in ascending order of rotation degrees, to obtain a submodel formed by using the six component elements c. According to the combination rule of the component elements d, the six component elements d are separately rotated clockwise by 30°, 0°, 60°, 120°, 180°, 240°, and 300°, and the rotated six component elements d are circled in ascending order of rotation degrees, to obtain a submodel formed by using the six component elements d. The terminal device combines the obtained submodels based on location information indicated by the combination rule of the component element a, location information indicated by the combination rule of the component element b, location information indicated by the combination rule of the component element c, and location information indicated by the combination rule of the component element d, to obtain a snowflake 3D model that is not rendered. The terminal device renders, based on the geometric information and the material textures information of the component element a, the six component elements a in the snowflake 3D model that is not rendered; renders, based on the geometric information and the material textures information of the component element b, the six component elements b in the snowflake 3D model that is not rendered; renders, based on the geometric information and the material textures information of the component element c, the six component elements c in the snowflake 3D model that is not rendered; and renders, based on the geometric information and the material textures information of the component element d, the six component elements d in the snowflake 3D model that is not rendered, to finally obtain the snowflake 3D model shown in FIG. 4.

In another example, the terminal device combines the component element a, the component element b, the component element c, and the component element d based on the location information indicated by the combination rule of the component element a, the location information indicated by the combination rule of the component element b, the location information indicated by the combination rule of the component element c, and the location information indicated by the combination rule of the component element d, to obtain one submodel; and copies the submodel based on a quantity indicated by the combination rule, to obtain six submodels. The six submodels are separately rotated by 0°, 60°, 120°, 180°, 240°, and 300°, and then the rotated six submodels are circled in ascending order of rotation degrees, to obtain a snowflake 3D model that is not rendered. The terminal device renders, based on the geometric information and the material textures information of the component element a, the six component elements a in the snowflake 3D model that is not rendered; renders, based on the geometric information and the material textures information of the component element b, the six component elements b in the snowflake 3D model that is not rendered; renders, based on the geometric information and the material textures information of the component element c, the six component elements c in the snowflake 3D model that is not rendered; and renders, based on the geometric information and the material textures information of the component element d, the six component elements d in the snowflake 3D model that is not rendered, to finally obtain the snowflake 3D model shown in FIG. 4.

Figure 5:
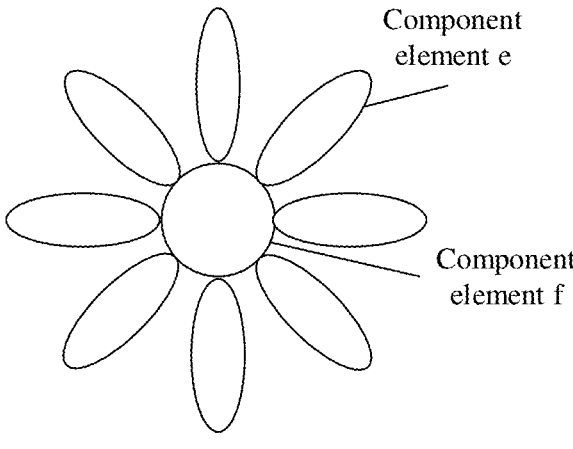
FIG. 5 is a schematic diagram of an example petal 3D model according to an embodiment of this application.

For another example, assuming that the terminal device needs to generate a petal 3D model of the user A, the terminal device sends an identifier of the user A and a 3D model category identifier to the server, where the 3D model category identifier is used to indicate the petal 3D model; and the server obtains a component element set and a combination rule of the petal 3D model based on the identifier of the user A and the 3D model category identifier. The component element set of the petal 3D model includes two component elements, including a component element e and a component element f. The terminal device copies the component element e in the component element set of the petal 3D model according to the combination rule of the petal 3D model, to obtain eight component elements e; and then the terminal combines the eight component elements e and the component element f according to location information indicated by the combination rule, to obtain a petal 3D model that is not rendered, as shown in FIG. 5. The terminal device renders, based on geometric information and material textures information of the component element e, the eight component elements e in the snowflake 3D model that is not rendered; and renders, based on geometric information and material textures information of the component element f, the component element f in the petal 3D model that is not rendered, to finally obtain the petal 3D model.

In another example, the combination rule of the petal 3D model includes a combination rule of the component element e and a combination rule of the component element f. The component element e is copied according to the combination rule of the component element e, to obtain 8 component elements e. The component element f is not copied according to the combination rule of the component element f. According to the combination rule of the component element e, the eight component elements a are separately rotated clockwise by 0°, 45°, 90°, 135°, 180°, 225°, 270°, and 315°, and the rotated eight component elements e are circled in ascending order of rotation degrees, to obtain a submodel formed by using the eight component elements e. The terminal device combines the obtained submodel and the component element f based on location information indicated by the combination rule of the component element e and location information indicated by the combination rule of the component element f, to obtain the petal 3D model that is not rendered.

It can be learned that, in the solution of this application, the server stores the component element and the combination rule that can form the 3D model. Compared with the conventional technology in which a complete 3D model is stored, the method in this application can reduce storage overheads of the server. Because the component element set and the combination rule instead of the complete 3D model are transmitted between the terminal device and the server, bandwidth resources between the terminal device and the server can be reduced. During rendering, the complete 3D model is rendered only by using rendering information of the component element in the component element set, rather than rendering information of the component elements forming the complete 3D model. That is, during GPU rendering, the rendering information of the component element in the component element set requires to be pushed to the GPU only once, and the GPU can render the complete 3D model by using the rendering information of the component element in the component element set. This can reduce overheads of storing the rendering information, and improve rendering efficiency of the model. The rendering information herein may include geometric information of the component element, and may further include material textures information of the component element.

Figure 6:
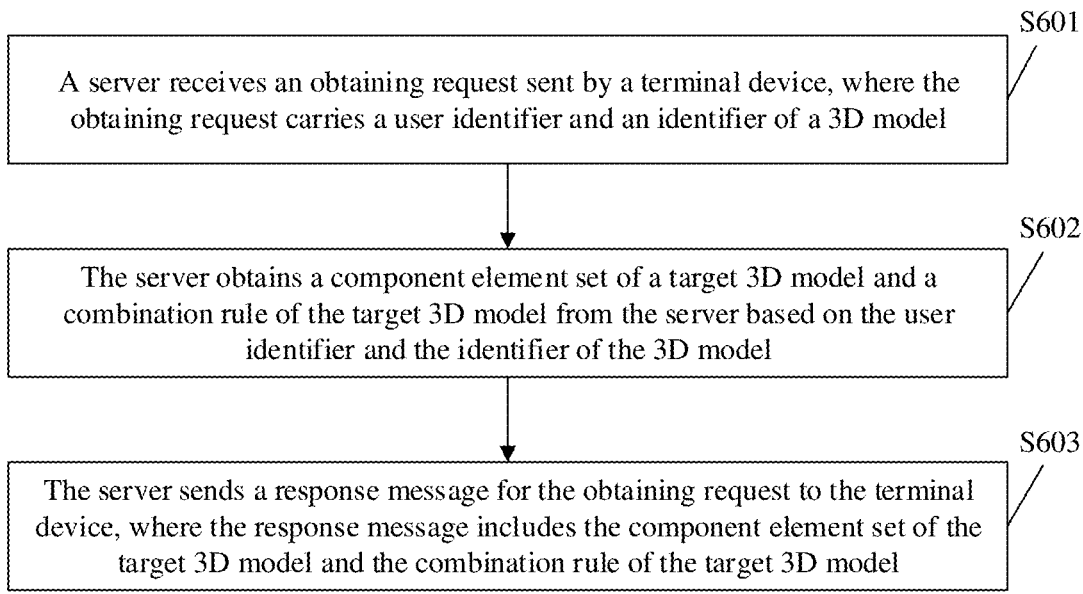
FIG. 6 is a schematic flowchart of another example 3D model generation method according to an embodiment of this application.

FIG. 6 is a schematic flowchart of another example 3D model generation method according to an embodiment of this application. As shown in FIG. 6, the method includes the following steps.

S601: A server receives an obtaining request sent by a terminal device, where the obtaining request carries a user identifier and an identifier of a 3D model.

Optionally, the user identifier may be an ID of a user, or a profile picture of a user, or fingerprint information or voiceprint information of a user. Optionally, the 3D model category identifier may be a 3D model ID or a 3D model image.

Component elements forming the 3D model include same or similar component elements. A target 3D model may be a symmetric model, for example, a petal 3D model, a snowflake 3D model, or a fruit 3D model. Optionally, some models in the target 3D models are symmetric.

S602: The server obtains a component element set of the target 3D model and a combination rule of the target 3D model from the server based on the user identifier and the identifier of the 3D model.

The server stores at least one component element and at least one preset combination rule, the at least one preset combination rule corresponds to at least one component element set, and each of the at least one component element set includes one or more of the at least one component element. The combination rule of the target 3D model is a combination rule that is in the at least one preset combination rule and that corresponds to the component element set of the target 3D model. A quantity of component elements in the component element set of the target 3D model is less than a quantity of component elements forming the target 3D model.

In an example, the server stores at least one component element set of the 3D model, and at least one combination rule corresponding to the at least one component element set of the 3D model, and a correspondence table. The correspondence table is a correspondence table between a component element set of the 3D model and a user identifier and a 3D model category identifier. After receiving the user identifier and the 3D model category identifier, the server determines the component element set of the target 3D model based on the received user identifier, 3D model category identifier, and correspondence table, and obtains the combination rule corresponding to the component element set of the target 3D model.

In another embodiment, the server stores at least one category of component element set. A component element set in the at least one category of component element set includes at least one component element, and one or more of the at least one component element correspond to one user identifier. After receiving the user identifier and the 3D model category identifier, the server determines, based on the 3D model category identifier, that a 3D model required by the terminal device is the target 3D model, that is, a model indicated by the 3D model category identifier is the target 3D model. When determining the target 3D model, the server determines based on prior knowledge, a category of component elements forming the target 3D model; and determines, from the plurality of categories of component element sets based on the category of the component elements forming the target 3D model, one or more component element sets corresponding to the categories of the component elements forming the target 3D model. The terminal device determines, from each component element set of the one or more component element sets based on the user identifier, one or more component elements corresponding to the target user identifier. If a plurality of component elements are determined from one component element set, the terminal device selects, from the plurality of component elements, one component element that is most frequently used by the user. In this manner, the terminal device selects, from each of the one or more component element sets, one component element corresponding to the target user identifier, and these selected component elements form the component element set of the target 3D model. In the server, a category of component element set corresponds to a combination rule, that is, combination rules of component elements belonging to a same category are the same, and are all combination rules corresponding to the category of component element set. When the component element set of the target 3D model is obtained, in the foregoing manner, from the at least one category of component element set stored in the server, a combination rule of each component element in the component element set of the target 3D model may also be obtained at the same time. In this case, it may be considered that the combination rule of the target 3D model includes the combination rule of each component element in the component element set of the target 3D model.

In another embodiment, the server stores at least one component element or at least one category of component element set. After obtaining the user identifier and the 3D model category identifier, the server processes the user identifier and the 3D model category identifier based on a preset function, to obtain an identifier of the component element in the component element set of the target 3D model; and determines, based on the identifier of the component element, an element indicated by the identifier of the component element from the component element stored in the memory. These component elements form the component element set of the target 3D model. In the server, a category of component element set corresponds to a combination rule, that is, combination rules of component elements belonging to a same category are the same, and are all combination rules corresponding to the category of component element set. When the component element set of the target 3D model is obtained, in the foregoing manner, from the at least one component element or the at least one component element set stored in the server, a combination rule of each component element in the component element set of the target 3D model may also be obtained at the same time. In an example, the server further stores a combination rule of each of the at least one component element stored in the server. When determining the component element set of the target 3D model from the at least one component element stored in the server, the server may obtain the combination rule of each component element in the component element set of the target 3D model. In this case, it may be considered that the combination rule of the target 3D model includes the combination rule of each component element in the component element set of the target 3D model.

Optionally, the server stores the at least one preset combination rule, and the at least one preset combination rule corresponds to the at least one component element set. After determining the component element set of the target 3D model in the foregoing manner, the server determines, according to the correspondence between the at least one preset combination rule and the at least one component element set, the preset combination rule corresponding to the component element set of the target 3D model, where the combination rule is the combination rule of the target 3D model.

S603: The server sends a response message for the obtaining request to the terminal device, where the response message includes the component element set of the target 3D model and the combination rule of the target 3D model.

In a feasible embodiment, the server further stores material textures information of each of the at least one component element, and the response message further carries material textures information of each component element in the component element set of the target 3D model.

It can be learned that, in the solution of this application, the server stores the component element and the combination rule that can form the 3D model. Compared with the conventional technology in which a complete 3D model is stored, the method in this application can reduce storage overheads of the server. Because the component element set and the combination rule instead of the complete 3D model are transmitted between the terminal device and the server, bandwidth resources between the terminal device and the server can be reduced.

Figure 7:
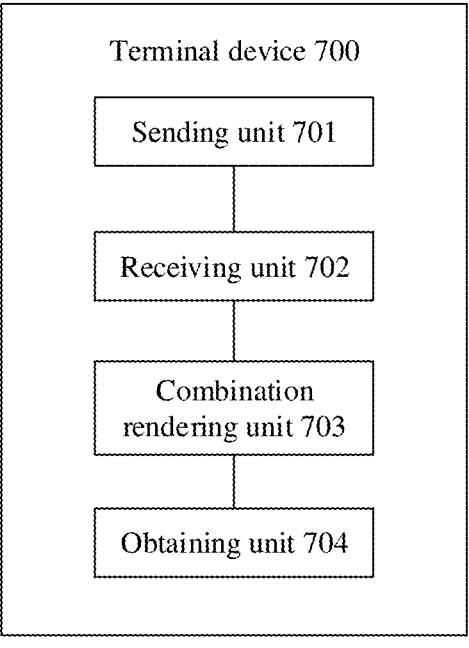
FIG. 7 is a schematic diagram of a structure of an example terminal device according to an embodiment of this application.

FIG. 7 is a schematic diagram of a structure of an example terminal device according to an embodiment of this application. As shown in FIG. 7, the terminal device 700 includes:

a sending unit 701, configured to send an obtaining request to a server, where the obtaining request carries a user identifier and a 3D model category identifier;

a receiving unit 702, configured to receive a response message sent by the server for the obtaining request, where the response message includes a component element set of a target 3D model and a combination rule of the target 3D model that are determined by the server based on the user identifier and the 3D model category identifier; the server stores at least one component element and at least one preset combination rule, the at least one preset combination rule corresponds to at least one component element set, and each of the at least one component element set includes one or more of the at least one component element; the combination rule of the target 3D model is a combination rule that is in the at least one preset combination rule and that corresponds to the component element set of the target 3D model; and a quantity of component elements in the component element set of the target 3D model is less than a quantity of component elements forming the target 3D model; and a combination rendering unit 703, configured to perform combination and rendering based on the component element set of the target 3D model and the combination rule of the target 3D model, to obtain the target 3D model.

In a feasible embodiment, the component element set of the target 3D model includes geometric information of each component element in the component element set of the target 3D model, and the combination rendering unit 703 is specifically configured to:

copy some or all component elements in the component element set of the target 3D model according to the combination rule, to obtain the component elements forming the target 3D model; perform, according to the combination rule, combination processing on the component elements forming the target 3D model, to obtain the target 3D model that is not rendered; and render, based on the geometric information of each component element in the component element set of the target 3D model, the target 3D model that is not rendered, to obtain the target 3D model.

In a feasible embodiment, the server further stores material textures information of each of the at least one component element, and the response message further carries material textures information of each component element in the component element set of the target 3D model; and when rendering, based on the geometric information of each component element in the component element set of the target 3D model, the target 3D model that is not rendered, to obtain the target 3D model, the combination rendering unit 703 is specifically configured to:

render, based on the material textures information and the geometric information of each component element in the component element set of the target 3D model, the target 3D model that is not rendered, to obtain the target 3D model.

In a feasible embodiment, the terminal device 700 further includes:

an obtaining unit 704, configured to obtain material textures information that is of each component element in the component element set and that is input by a user; and when rendering, based on the geometric information of each component element in the component element set of the target 3D model, the target 3D model that is not rendered, to obtain the target 3D model, the combination rendering unit 703 is specifically configured to:

render, based on the material textures information input by the user and the geometric information that are of each component element in the component element set of the target 3D model, the target 3D model that is not rendered, to obtain the target 3D model.

It should be noted that the foregoing units (the sending unit 701, the receiving unit 702, the combination rendering unit 703, and the obtaining unit 704) are configured to perform related steps of the foregoing method. The sending unit 701 is configured to implement related content in S301, the receiving unit 702 is configured to implement related content in S302, and the combination rendering unit 703 and the obtaining unit 704 are configured to implement related content in S303.

In this embodiment, the terminal device 700 is presented in a form of units. The "unit" herein may be an application-specific integrated circuit (ASIC), a processor and a memory for executing one or more software or firmware programs, an integrated logic circuit, and/or another device that can provide the foregoing functions. In addition, the combination rendering unit 703 and the obtaining unit 704 may be implemented by using a processor 901 of a terminal apparatus shown in FIG. 9.

Figure 8:
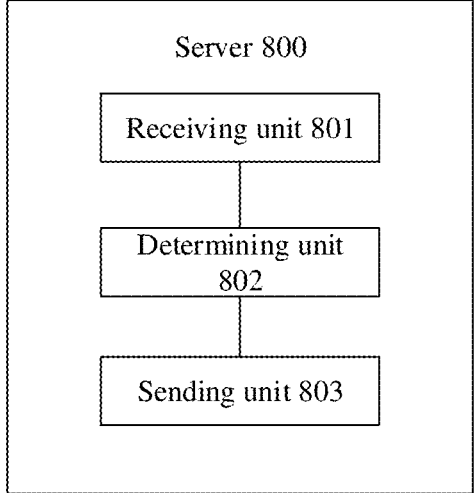
FIG. 8 is a schematic diagram of a structure of an example server according to an embodiment of this application.

FIG. 8 is a schematic diagram of a structure of an example server according to an embodiment of this application. As shown in FIG. 8, a server 800 includes:

a receiving unit 801, configured to receive an obtaining request sent by a terminal device, where the obtaining request carries a user identifier and an identifier of a 3D model;

a determining unit 802, configured to obtain a component element set of a target 3D model and a combination rule of the target 3D model from the server based on the user identifier and the identifier of the 3D model, where the server stores at least one component element and at least one preset combination rule; the at least one preset combination rule corresponds to at least one component element set, and each of the at least one component element set includes one or more of the at least one component element; the combination rule of the target 3D model is a combination rule that is in the at least one preset combination rule and that corresponds to the component element set of the target 3D model; and a quantity of component elements in the component element set of the target 3D model is less than a quantity of component elements forming the target 3D model; and a sending unit 803, configured to send a response message for the obtaining request to the terminal device, where the response message includes the component element set of the target 3D model and the combination rule of the target 3D model.

In a feasible embodiment, the server further stores material textures information of each of the at least one component element, and the response message further carries material textures information of each component element in the component element set of the target 3D model.

It should be noted that the foregoing units (the receiving unit 801, the determining unit 802, and the sending unit 803) are configured to perform related steps of the foregoing methods. The receiving unit 801 is configured to implement related content of S601, the determining unit 802 is configured to implement related content of S602, and the sending unit 803 is configured to implement related content of S603.

In this embodiment, the server 800 is presented in a form of a unit. The "unit" herein may be an application-specific integrated circuit (ASIC), a processor and a memory for executing one or more software or firmware programs, an integrated logic circuit, and/or another device that can provide the foregoing functions. In addition, the determining unit 802 may be implemented by using a processor 1001 of a server shown in FIG. 10.

Figure 9:
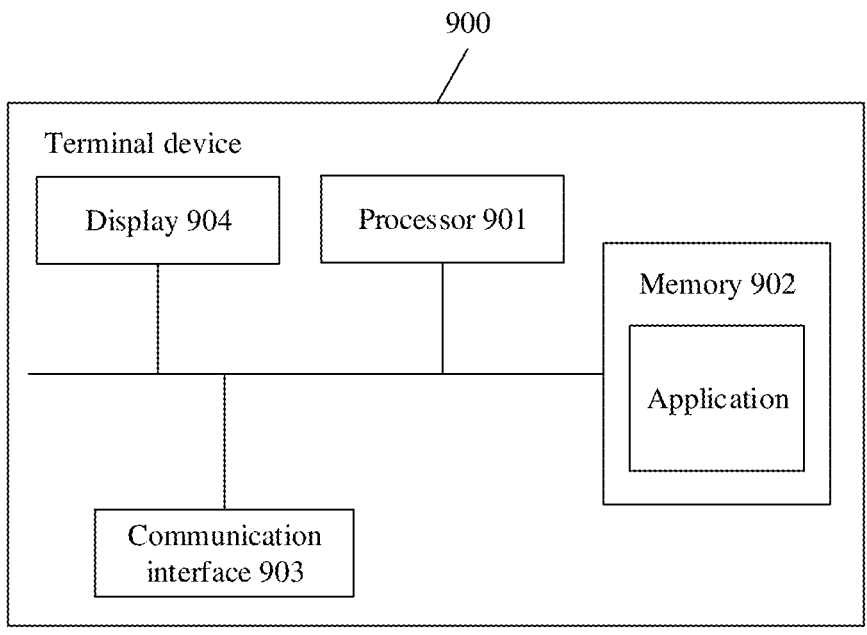
FIG. 9 is a schematic diagram of a structure of another example terminal device according to an embodiment of this application.

As shown in FIG. 9, a terminal device 900 may be implemented in a structure shown in FIG. 9. The terminal device 900 may include at least one processor 901, at least one memory 902, and at least one communication interface 903. The processor 901, the memory 902, and the communication interface 903 are connected to and communicate with each other through a communication bus. Optionally, the terminal device 900 further includes a display 904.

The processor 901 may be a general-purpose CPU, a microprocessor, an application-specific integrated circuit (ASIC), or one or more integrated circuits for controlling program execution of the foregoing solution. The processor 901 further includes a GPU.

The communication interface 903 is configured to communicate with another device or a communication network such as Ethernet, a radio access network (RAN), or a wireless local area network (WLAN).

The memory 902 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including compressed optical disc, a laser disc, an optical disc, a digital versatile disc, a Blu-ray disc, or the like), a magnetic disk storage medium, another magnetic storage device, or any other medium that can be configured to carry or store expected program code in a form of an instruction or a data structure and that can be accessed by a computer. However, this is not limited thereto. The memory may exist independently, and is connected to the processor through the bus. The memory may alternatively be integrated with the processor.

The memory 902 is configured to store application program code used to execute the foregoing solution, and the processor 901 controls the execution. The processor 901 is configured to execute the application program code stored in the memory 902.

The code stored in the memory 902 may perform any 3D model generation method provided above, for example:

sending an obtaining request to a server, where the obtaining request carries a user identifier and a 3D model category identifier; receiving a response message sent by the server for the obtaining request, where the response message includes a component element set of a target 3D model and a combination rule of the target 3D model that are determined by the server based on the user identifier and the 3D model category identifier; the server stores at least one component element and at least one preset combination rule, the at least one preset combination rule corresponds to at least one component element set, and each of the at least one component element set includes one or more of the at least one component element; the combination rule of the target 3D model is a combination rule that is in the at least one preset combination rule and that corresponds to the component element set of the target 3D model; and a quantity of component elements in the component element set of the target 3D model is less than a quantity of component elements forming the target 3D model; performing combination and rendering based on the component element set of the target 3D model and the combination rule of the target 3D model, to obtain the target 3D model.

The GPU is configured to render the target 3D model that is not rendered, and display, by using the display 904, the target 3D model obtained through rendering.

Figure 10:
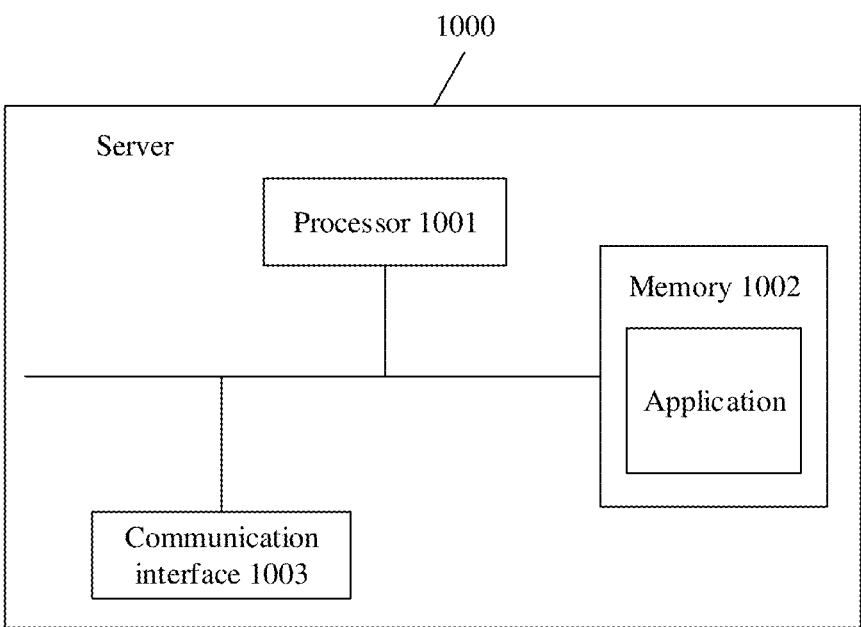
FIG. 10 is a schematic diagram of an example structure of another server according to an embodiment of this application.

As shown in FIG. 10, an example server 1000 may be implemented in a structure shown in FIG. 10. The server 1000 may include at least one processor 1001, at least one memory 1002, and at least one communication interface 1003. The processor 1001, the memory 1002, and the communication interface 1003 are connected to and communicate with each other through a communication bus.

The processor 1001 may be a general-purpose CPU, a microprocessor, an application-specific integrated circuit (ASIC), or one or more integrated circuits for controlling program execution of the foregoing solution.

The communication interface 1003 is configured to communicate with another device or a communication network such as Ethernet, a radio access network (RAN), or a wireless local area network (WLAN).

The memory 1002 may be a ROM or another type of static storage device that can store static information and instructions, or a RAM or another type of dynamic storage device that can store information and instructions, or may be an EEPROM, a CD-ROM or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer, but this is not limited thereto. The memory may exist independently, and is connected to the processor through the bus. The memory may alternatively be integrated with the processor.

The memory 1002 is configured to store application program code used to execute the foregoing solution, and the processor 1001 controls the execution. The processor 1001 is configured to execute the application program code stored in the memory 1002.

The code stored in the memory 1002 may perform any 3D model generation method provided above, for example:

receiving an obtaining request sent by a terminal device, where the obtaining request carries a user identifier and an identifier of a 3D model; obtaining a component element set of a target 3D model and a combination rule of the target 3D model from a server based on the user identifier and the identifier of the 3D model, where the server stores at least one component element and at least one preset combination rule; the at least one preset combination rule corresponds to at least one component element set, and each of the at least one component element set includes one or more of the at least one component element; the combination rule of the target 3D model is a combination rule that is in the at least one preset combination rule and that corresponds to the component element set of the target 3D model; and a quantity of component elements in the component element set of the target 3D model is less than a quantity of component elements forming the target 3D model; and sending a response message for the obtaining request to the terminal device, where the response message includes the component element set of the target 3D model and the combination rule of the target 3D model.

An embodiment of this application further provides a computer storage medium. The computer storage medium may store a program, and when the program is executed, some or all of the steps of any 3D model generation method recorded in the foregoing method embodiments may be performed.

An embodiment of this application further provides a computer program. The computer program is executed to implement some or all steps of any 3D model generation method recorded in the foregoing method embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are only examples. For example, division into the units is only logical function division, and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the conventional technology, or all or some of the technical solutions may be implemented in the form of a software product. The computer software product is stored in a memory and includes several instructions for instructing a computer device (which may be a personal computer, a server, a network device, or the like) to perform all or some of the steps of the methods described in embodiments of this application. The foregoing memory includes any medium that can store program code, such as a USB flash drive, a ROM, a RAM, a removable hard disk, a magnetic disk, or an optical disc.

A person of ordinary skill in the art may understand that all or some of the steps of the methods in the embodiments may be implemented by a program instructing related hardware. The program may be stored in a computer readable memory. The memory may include: a flash memory, a ROM, a RAM, a magnetic disk, or an optical disc.

The foregoing describes example embodiments of this application in detail. The principle and implementations of this application are described herein by using specific examples. The description about the above embodiments is only provided to help understand the method and core ideas of this application. In addition, a person of ordinary skill in the art can make variations and modifications to this appli- cation in terms of the specific implementations and appli- cation scopes according to the ideas of this application. Therefore, the content of specification shall not be construed as a limit to this application.

What is claimed is:

1. A 3D model generation method, comprising:

sending, by a terminal device, an obtaining request to a server, wherein the obtaining request carries a user identifier and a 3D model category identifier;

receiving, by the terminal device, a response message sent by the server in response to the obtaining request, wherein the response message comprises a component element set of a target 3D model and a combination rule of the target 3D model that are determined by the server based on the user identifier and the 3D model category identifier; the server stores at least one component element and at least one preset combination rule cor- responding to at least one component element set, and each of the at least one component element set com- prises one or more of the at least one component element stored in the server; the combination rule of the target 3D model is in the at least one preset combina- tion rule and corresponds to the component element set of the target 3D model; and a quantity of component elements in the component element set of the target 3D model is less than a quantity of component elements forming the target 3D model; and performing, by the terminal device, combination and rendering based on the component element set of the target 3D model and the combination rule of the target 3D model, to obtain the target 3D model.

2. The method according to claim 1, wherein the compo- nent element set of the target 3D model comprises geometric information of each component element in the component element set of the target 3D model; and the performing, by the terminal device, combination and rendering based on the component element set of the target 3D model and the combination rule of the target 3D model, to obtain the target 3D model comprises:

copying, by the terminal device, at least one component element in the component element set of the target 3D model according to the combination rule, to obtain the component elements forming the target 3D model;

performing, by the terminal device according to the combination rule, combination processing on the com- ponent elements forming the target 3D model, to obtain the target 3D model that is not rendered; and rendering, by the terminal device based on the geometric information of each component element in the compo- nent element set of the target 3D model, the target 3D model that is not rendered, to obtain the target 3D model.

3. The method according to claim 2, wherein the server further stores material textures information of each of the at least one component element stored in the server, and the response message further carries material textures informa- tion of each component element in the component element set of the target 3D model; and the rendering, by the terminal device based on the geometric information of each compo- nent element in the component element set of the target 3D model, the target 3D model that is not rendered, to obtain the target 3D model comprises:

rendering, by the terminal device based on the material textures information and the geometric information of each component element in the component element set of the target 3D model, the target 3D model that is not rendered, to obtain the target 3D model.

4. The method according to claim 2, further comprising:

obtaining, by the terminal device, material textures infor- mation, of each component element in the component element set, that is input by a user; and the rendering, by the terminal device based on the geo- metric information of each component element in the component element set of the target 3D model, the target 3D model that is not rendered, to obtain the target 3D model comprises:

rendering, by the terminal device based on the material textures information input by the user and the geomet- ric information of each component element in the component element set of the target 3D model, the target 3D model that is not rendered, to obtain the target 3D model.

5. The method of claim 1, wherein the target 3D model is a petal 3D model, a snowflake 3D model, or a fruit 3D model.

6. The method of claim 5, wherein the 3D model category identifier indicates the petal 3D model, the snowflake 3D model, or the fruit 3D model.

7. The method of claim 1, wherein the target 3D model is a snowflake 3D model, the component element set of the snowflake 3D model includes four component elements, each component element in the component element set of the snowflake 3D model is copied according to the combi- nation rule of the snowflake 3D model to obtain multiple copied component elements.

8. The method according to claim 7, wherein the combi- nation rule of each of the four component elements com- prises separately rotating the multiple copied component elements clockwise, and then circling the rotated multiple copied component elements in ascending order of rotation degrees, to obtain a submodel formed by using the multiple copied component elements.

9. The method according to claim 7, wherein each com- ponent element in the component element set of the snow- flake 3D model is copied according to the combination rule of the snowflake 3D model to obtain six copied component elements.

10. A 3D model generation method, used on a server, and comprising:

receiving an obtaining request sent by a terminal device, wherein the obtaining request carries a user identifier and an identifier of a 3D model;

obtaining a component element set of a target 3D model and a combination rule of the target 3D model from the server based on the user identifier and the identifier of the 3D model, wherein the server stores at least one component element and at least one preset combination rule corresponding to at least one component element set, and each of the at least one component element set comprises one or more of the at least one component element stored in the server; the combination rule of the target 3D model is in the at least one preset combina- tion rule and corresponds to the component element set of the target 3D model; and a quantity of component elements in the component element set of the target 3D model is less than a quantity of component elements forming the target 3D model; and sending a response message in response to the obtaining request to the terminal device, wherein the response message comprises the component element set of the target 3D model and the combination rule of the target 3D model.

11. The method according to claim 10, wherein the server further stores material textures information of each of the at least one component element stored in the server, and the response message further carries material textures information of each component element in the component element set of the target 3D model.

12. A terminal device, comprising:

a transmitter, configured to send an obtaining request to a server, wherein the obtaining request carries a user identifier and a 3D model category identifier;

a receiver, configured to receive a response message sent by the server in response to the obtaining request, wherein the response message comprises a component element set of a target 3D model and a combination rule of the target 3D model that are determined by the server based on the user identifier and the 3D model category identifier; the server stores at least one component element and at least one preset combination rule corresponding to at least one component element set, and each of the at least one component element set comprises one or more of the at least one component element stored in the server; the combination rule of the target 3D model is in the at least one preset combination rule and corresponds to the component element set of the target 3D model; and a quantity of component elements in the component element set of the target 3D model is less than a quantity of component elements forming the target 3D model; and a combination rendering processor, configured to perform combination and rendering based on the component element set of the target 3D model and the combination rule of the target 3D model, to obtain the target 3D model.

13. The terminal device according to claim 12, wherein the component element set of the target 3D model comprises geometric information of each component element in the component element set of the target 3D model, and the combination rendering processor is further configured to:

copy at least one component element in the component element set of the target 3D model according to the combination rule, to obtain the component elements forming the target 3D model;

perform, according to the combination rule, combination processing on the component elements forming the target 3D model, to obtain the target 3D model that is not rendered; and render, based on the geometric information of each component element in the component element set of the target 3D model, the target 3D model that is not rendered, to obtain the target 3D model.

14. The terminal device according to claim 13, wherein the server further stores material textures information of each of the at least one component element stored in the server, and the response message further carries material textures information of each component element in the component element set of the target 3D model; and when rendering, based on the geometric information of each component element in the component element set of the target 3D model, the target 3D model that is not rendered, to obtain the target 3D model, the combination rendering processor is further configured to:

render, based on the material textures information and the geometric information of each component element in the component element set of the target 3D model, the target 3D model that is not rendered, to obtain the target 3D model.

15. The terminal device according to claim 13, further comprising:

an obtainer, configured to obtain material textures information, of each component element in the component element set, that is input by a user; and when rendering, based on the geometric information of each component element in the component element set of the target 3D model, the target 3D model that is not rendered, to obtain the target 3D model, the combination rendering processor is further configured to:

render, based on the material textures information input by the user and the geometric information of each component element in the component element set of the target 3D model, the target 3D model that is not rendered, to obtain the target 3D model.

* * * * *